(12) United States Patent
Stacey et al.

(10) Patent No.: US 9,820,167 B2
(45) Date of Patent: *Nov. 14, 2017

(54) METHOD AND APPARATUS OF MULTIBAND COMMUNICATION

(71) Applicant: Intel Corporation, Santa Clara, CA (US)

(72) Inventors: Robert Stacey, Portland, OR (US); Adrian P. Stephens, Cambridge (GB); Srikathyayani Srikanteswara, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,814

(22) Filed: Feb. 3, 2013

(65) Prior Publication Data

US 2013/0148529 A1 Jun. 13, 2013

Related U.S. Application Data

(63) Continuation of application No. 12/647,230, filed on Dec. 24, 2009, now Pat. No. 8,374,100.

(51) Int. Cl.
H04W 24/00 (2009.01)
H04W 48/08 (2009.01)
(Continued)

(52) U.S. Cl.
CPC ........... *H04W 24/00* (2013.01); *H04W 36/30* (2013.01); *H04W 48/08* (2013.01); *H04W 72/02* (2013.01); *H04W 36/06* (2013.01)

(58) Field of Classification Search
CPC ..... H04W 16/14–16/16; H04W 36/04; H04W 36/36; H04W 48/08–48/10; H04W 48/16;
(Continued)

(56) References Cited

U.S. PATENT DOCUMENTS 6,806,786 B1 10/2004 Lam et al.
8,374,100 B2 2/2013 Stacey et al.
(Continued)

FOREIGN PATENT DOCUMENTS

CN 101156421 4/2008
CN 101472299 7/2009
(Continued)

OTHER PUBLICATIONS

International Search Report and Written Opinion for PCT/US2010/058693 dated Aug. 29, 2011, 10 pages.
(Continued)

*Primary Examiner* — Eric Myers
(74) *Attorney, Agent, or Firm* — Hanley, Flight & Zimmerman, LLC

(57) ABSTRACT

A system and method for multiband rate scaling for communication, particularly wireless communication. A band is used as a parameter for wireless communication performance when a wireless communication channel has a plurality of available bands for communication. A selected communication band may be switched to another available communication band, where the switching may be based on a desired performance determination.

19 Claims, 3 Drawing Sheets

(51) Int. Cl.
*H04W 72/02* (2009.01)
*H04W 36/30* (2009.01)
*H04W 36/06* (2009.01)

(58) Field of Classification Search
CPC .......... H04W 52/0216; H04W 52/367; H04W 72/0453; H04W 72/1289
USPC ....... 370/229, 230, 235, 252, 310, 431, 437, 370/436, 441, 442, 464, 465; 455/68, 455/113, 119, 126, 127.1, 452.1, 450, 455/433, 552.1, 509; 375/260; 714/712, 714/746
See application file for complete search history.

(56) References Cited

U.S. PATENT DOCUMENTS

| | | | |
|---|---|---|---|
| 2002/0147953 A1* | 10/2002 | Catreux et al. | 714/746 |
| 2003/0148764 A1* | 8/2003 | Kelley | 455/434 |
| 2003/0228851 A1* | 12/2003 | Taniguchi | 455/126 |
| 2004/0009770 A1* | 1/2004 | Sivanandan et al. | 455/425 |
| 2004/0052252 A1* | 3/2004 | Karaoguz et al. | 370/389 |
| 2005/0003769 A1* | 1/2005 | Foerster et al. | 455/113 |
| 2005/0060414 A1* | 3/2005 | Phillips et al. | 709/227 |
| 2006/0063543 A1* | 3/2006 | Matoba et al. | 455/509 |
| 2006/0073827 A1* | 4/2006 | Vaisanen et al. | 455/436 |
| 2006/0092880 A1* | 5/2006 | Nounin et al. | 370/331 |
| 2006/0223574 A1* | 10/2006 | Chandra | 455/552.1 |
| 2007/0135122 A1* | 6/2007 | Dillon et al. | 455/433 |
| 2007/0287469 A1* | 12/2007 | Wijting et al. | 455/454 |
| 2008/0008159 A1* | 1/2008 | Bourlas et al. | 370/352 |
| 2008/0075038 A1 | 3/2008 | Jin et al. | |
| 2008/0117850 A1* | 5/2008 | Agrawal et al. | 370/311 |
| 2008/0220788 A1* | 9/2008 | Stanwood et al. | 455/450 |
| 2009/0029710 A1* | 1/2009 | Ochiai | H04L 5/023 455/450 |
| 2009/0154588 A1* | 6/2009 | Chen et al. | 375/267 |
| 2010/0029216 A1* | 2/2010 | Jovicic et al. | 455/68 |
| 2010/0074190 A1* | 3/2010 | Cordeiro et al. | 370/329 |
| 2010/0265837 A1* | 10/2010 | Sakai | 370/252 |
| 2010/0285811 A1* | 11/2010 | Toda et al. | 455/452.1 |
| 2010/0330914 A1* | 12/2010 | Chandra | 455/62 |
| 2010/0330918 A1* | 12/2010 | Taghavi Nasrabadi et al. | 455/63.3 |
| 2010/0332822 A1* | 12/2010 | Liu et al. | 713/151 |
| 2011/0053521 A1* | 3/2011 | Cordeiro | 455/73 |
| 2011/0065440 A1* | 3/2011 | Kakani | 455/450 |
| 2011/0069650 A1* | 3/2011 | Singh et al. | 370/311 |
| 2011/0070842 A1* | 3/2011 | Kwon et al. | 455/67.13 |
| 2011/0110440 A1* | 5/2011 | Kwon et al. | 375/259 |
| 2011/0122801 A1* | 5/2011 | Franklin et al. | 370/280 |
| 2011/0255455 A1* | 10/2011 | Seok | 370/311 |
| 2012/0064873 A1* | 3/2012 | Farnsworth | 455/418 |

FOREIGN PATENT DOCUMENTS

| | | |
|---|---|---|
| EP | 0490509 A2 | 6/1992 |
| JP | 2002-335201 A | 11/2002 |
| JP | 2003-124942 A | 4/2003 |
| JP | 2003-224620 A | 8/2003 |
| JP | 2005-521358 A | 7/2005 |
| JP | 2006-197122 A | 7/2006 |
| JP | 2007-037029 A | 2/2007 |
| JP | 2008-535398 A | 8/2008 |
| KR | 10-2006-0094695 | 8/2006 |
| WO | 2006/107698 A2 | 10/2006 |
| WO | 2006/107698 A3 | 6/2007 |
| WO | 2008/053550 A1 | 5/2008 |
| WO | 2010/068066 A2 | 6/2010 |
| WO | 2011/078950 A2 | 6/2011 |
| WO | 2011/078950 A3 | 11/2011 |

OTHER PUBLICATIONS

International Preliminary Report on Patentability for PCT/US2010/058693, dated Jul. 5, 2012, 7 pages.
Office Action for U.S. Appl. No. 12/647,230 dated Apr. 11, 2012; 20 pages.
Office Action received for Chinese Patent Application No. 201010625039.4, dated Sep. 11, 2013, 3 pages on Office Action and 4 pages of English translation.
Office Action received for Chinese Patent Application No. 201010625039.4, dated Feb. 18, 2013, 7 pages on Office Action and 8 pages of English translation.
Office Action received for Japanese Patent Application No. 2012-540178, dated Aug. 6, 2013, 4 pages on Office Action and 2 pages of English translation.
Office Action received for Japanese Patent Application No. 2012-540178, dated Mar. 18, 2014, 4 pages on Office Action and 3 pages of English translation.
Office Action received for Chinese Patent Application No. 201010625039.4, dated Mar. 18. 2014. 3 pages on Office Action and 4 pages of English translation.
Office Action received for European Patent Application No. 13195266.5, dated Apr. 4, 2014, 2 pages.
Office Action received for European Patent Application No. 10839971.8, dated Mar. 18, 2014, 1 page.
Extended European Search Report received for Patent Application No. 13195266.5, dated Feb. 28, 2014. 9 Pages.
Extended European Search Report received for Patent Application No. 10839971.8, dated Feb. 28, 2014. 8 Pages.
Supplementary European Search Report received for Patent Application No. 10839971.8, dated Feb. 28, 2014, 1 Page.
Office Action Received for Chinese Patent Application No. 201010625039.4, dated Sep. 28, 2014. 7 Pages of Chinese Office Action and 9 Pages of English Translation.
Office Action Received for Chinese Patent Application No. 201010625039.4, dated Apr. 16, 2015, 7 Pages of Chinese Office Action and 10 Pages of English Translation.
State Intellectual Property Office of China, "First Office Action and English Translation," issued in connection with Chinese Patent Application No. 201310573265.6, dated Feb. 1, 2016 (9 pages).
State Intellectual Property Office of China, "Second Office Action," issued in connection with Chinese Patent Application No. 201310573265.6, dated Sep. 28, 2016 (9 pages).
The State Intellectual Property Office of China, "Decision on Rejection," issued in connection with application No. 201310573265.6 dated Apr. 5, 2017, 5 pages.

* cited by examiner

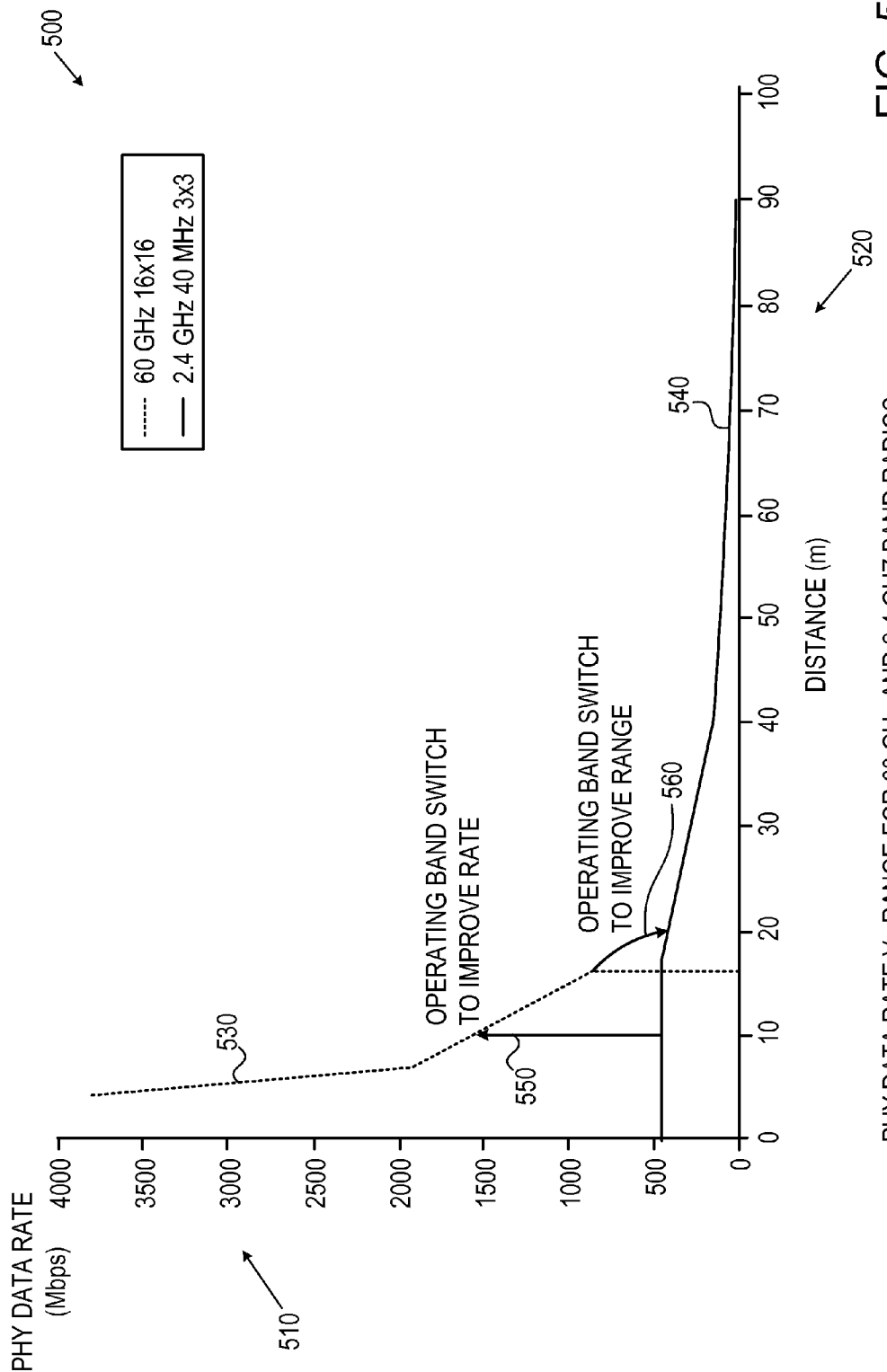

METHOD AND APPARATUS OF MULTIBAND COMMUNICATION

CROSS-REFERENCE

This application is a Continuation application of U.S. patent application Ser. No. 12/647,230, filed Dec. 24, 2009 and entitled "Method and System for Multiband Rate Scaling", the entire disclosure of which is incorporated herein by reference.

FIELD OF THE INVENTION

The present invention relates to wireless communication, and in particular to communication that may be performed using a plurality of frequency bands.

BACKGROUND OF THE INVENTION

Rate scaling or link adaptation may be a process by which a system may select a modulation coding scheme (MCS) for a transmission, for example an individual packet transmission that may be for an optimized transfer of data between two devices or systems. A MCS may determine a rate at which data may be transferred during any individual transmission, and may also contribute to a determination of a throughput, for example an average throughput, that may be achieved, where a throughput may be, for example, an amount of data that may be transferred during a given unit of time, and may also include an accounting for packet retransmissions and/or other system overhead parameters. In some systems that may operate within environmental constraints, throughput may be related to a distance or a range between a transmitter and a receiver, or between systems.

In some systems, there may be a capability for communication over more than one band, e.g. a frequency band, and such communication may be in accordance with a standard communication protocol, for example, any of the IEEE 802.11 protocols. During signal transmission in any one band there may be a limitation of a selected band on data rate, communication range, or other limitations. Systems may be restricted by limitations of a selected communication band, for example a system that may communicate over a low frequency band may be limited by a maximum data transfer rate that may be supported.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 depicts a plot of exemplary parameters according to embodiments of the present invention.

Figure 1:
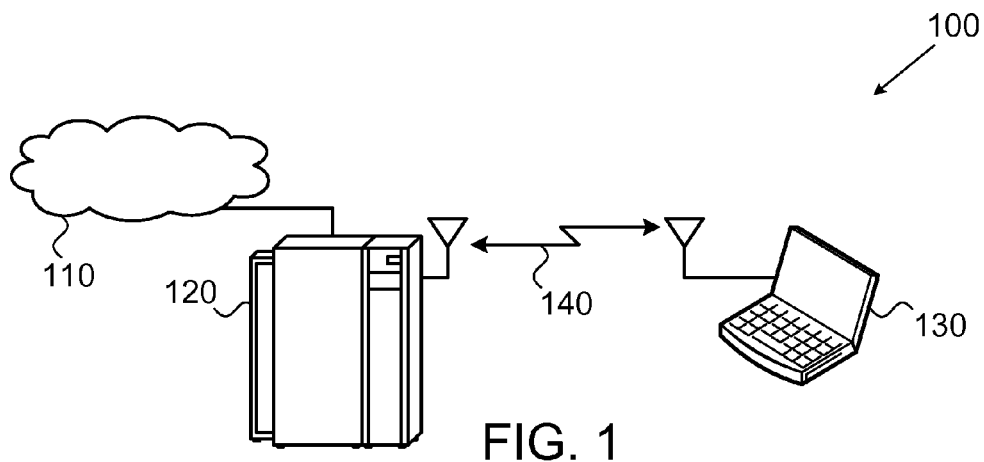
FIG. 1 depicts an exemplary block diagram illustrating a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a base station, a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, any consumer electronic device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.1x, 802.16, 802.16d, 802.16e, 802.11ad standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM) Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MCM), Discrete Multi-Tone (DMT), Bluetooth®, ZigBee™, or the like.

Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

Referring to FIG. 1, embodiments of the present invention may comprise one or more components of a system 100 as schematically depicted. Network 110 may be any network, including a LAN, a WAN, or the like, or may be the Internet, and may connect and enable communication among a plurality of computing devices, for example, clients, servers, access points, routers, etc.

A client 130 may wish to connect to a network 110 by means of a communication link or channel 140, for example, a wired, wireless, or other communication channel. Client 130 may comprise or be associated with a communication module, including for example, a modem, antenna, etc., suitable for communicating over the communication link. Client 130 may further comprise or be associated with a processor for performing the band selection methods described herein, including, for example, switching a band or carrier frequency of transmission. Client 130 may further comprise or be associated with a memory for storing thereon band data, including, for example, available bands for communication to and/or from client 130, as described below. Client 130 may also comprise a station of network 110, and may be referred to as a peer STA.

A gateway to the network may be, for example, wireless access device 120, which may communicate wirelessly with clients, and may be capable of such communication via a plurality of bands, for example frequency bands or information carrier frequencies. Access device 120 may be an access point (AP) communicating with clients via an IEEE 802.11 protocol, a base station communicating with clients via an IEEE 802.16 protocol, or any other wireless access device. For purposes of simplicity, the gateway will be referred to herein as an access point or access device, or station (STA), however, it will be understood that the access device may use any wireless protocol. AP STA 120 may comprise or be associated with a communication module, for example, a modem, antenna, etc. The gateway, or AP STA 120, may be associated with a processor for performing band selection and/or switching functions as described herein. The gateway, or AP STA 120, may further include, be associated with, or otherwise have access, e.g., local access, to a memory having stored thereon a device capability table, as described below.

A communication channel 140 may include a plurality of bands, for example frequency bands or frequency bandwidths around corresponding carrier frequencies. Bands may be in an unlicensed frequency band, for example, around an unlicensed 60 GHz band, or bands may be particularly associated with licensed bands of communication network 110. Bands may be around a plurality of frequencies, for example around 2.4 GHz, 5 GHz, or a ultra-high frequency (UHF) band. A band may have a designation, for example a 2.4 GHz band may be designated for instrumentation, scientific, measurement (ISM) purposes, or the like. A band at a higher frequency may have a greater data rate capacity, for example a band around 60 GHz may have a greater data carrying capacity than a band at UHF. A band at a lower frequency may have a longer communication range, for example a band at UHF may have a longer range than a band around 60 GHz.

A STA that may support multi-band rate scaling may be capable of operating in a plurality of bands, and selective change communication among the bands. A STA may indicate that it may be capable of a multi-band operation and also may list bands in which it may be able to operate by, for example, transmitting a capability information element. A capability information element may be sent to one or more peer STAs, or to clients, with which it may have communicated. A capability information element may be included in an element of a communication protocol that may be a standard communication protocol, for example an 802.11 protocol. An element of a protocol that may contain a capability information element may be a frame, or other command set, e.g. an Association Request, an Association Response, a Probe Request, a Probe Response, a Tower Data-Link Services (TDLS) Setup Request, a TDLS Setup Response, or a Beacon frame.

A peer STA, or a client, may receive a transmission from an AP STA of a capability information element, and may learn of a multi-band capability of another STA. Similarly, an AP STA may receive a transmission from a peer STA, or a client, of a capability information element. A peer STA may have previously communicated with a transmitting STA, and may share a capability of a peer STA with a transmitting STA. A determination may be made that a matching multi-band capability may exist between two STAs. Either STA may signal to another STA that a switch may be made to a multi-band operation, and may include a switch of an operation, e.g. data communication, among a plurality of channels, for example among a plurality of operating bands. A switching of data transmission bands may be performed for a variety of reasons, e.g. to extend a range of communication, to increase data transmission rate, to reduce power, or any other reason that provide a similar advantage.

One embodiment of the invention may be a method for making a determination to switch among available communication bands, where a STA may make such a determination. A STA may determine that it may have a small amount of traffic to send, or may be receiving a small amount of traffic from a peer, for example a peer STA or a client, and may switch to a band where, for example power may be conserved. For example, a STA may be operating in a 2.4 GHz band and may determine that lower power operation may be possible in a UHF band. Lower power may be achieved, for example, by utilizing a sampled channel width that may be lower at a lower band, and a STA may consume less power in, for example, an idle listening mode that a STA may be operating in while it may wait for a transmission from a peer STA.

In another embodiment, a STA may determine that a traffic load may be saturating a link in a current frequency band and may switch to another frequency band that may have a wider channel bandwidth, and may be done to increase an operating parameter, for example data throughput.

In another embodiment of the invention, a STA may determine that a signal quality may be high while operating in a lower frequency band, and may then determine that communication in a higher frequency band may be possible. For example, a STA may be operating in a 5 GHz frequency band and may have very high signal quality. From this high signal quality, a STA may determine that it may be close to a peer STA with which it may be communicating, and may communicate in a higher frequency band, e.g. around a 60 GHz band. A switch to a higher frequency band, e.g. a 60 GHz band, may be performed in order to support, for example, a greater communication bandwidth.

Another embodiment of the invention may be a STA that determines that a signal quality achieved by communicating in a high frequency band may be poor. In some embodiments, a STA may determine that a signal quality achieved by communicating in a high frequency band may be poor and no longer feasible in a band. Such a determination may be made, for example, if a limited response or no response is received from a peer STA that a STA may have been communicating with. A STA may make a determination to switch to a lower frequency band where, for example, communication may be possible. This switch may be performed, for example, when a range between STAs may have changed and communication may still be desired.

In another embodiment, a STA may receive feedback information, or for example, response data from a peer STA, and may indicate that communication in another frequency band may provide an improvement in communications. For example, an improvement may be any one or more of higher data transfer rates, greater data throughput, or lower power consumption. A STA may process this feedback information and may use it to determine whether or not to switch to another frequency band.

A STA, according to an embodiment of the invention, may make a determination to switch bands that may be based on a parameter of a type of traffic that may comprise a communication, for example, a quality of service. For example, a STA may communicate traffic including voice over Internet protocol (VoIP), and it may determine that communication in another band, e.g., a lower frequency, may provide a higher quality of service. Such a determination may consider one or more quality of service parameters, for example a lower probability of an outage, or a robustness of communication in the decision to switch to another communication band.

In some embodiments a wireless access device 120 may enable access to a peer client. A peer client may comprise or be associated with a communication module, including for example, a modem, antenna, etc., suitable for communicating over the communication link. A peer client may further comprise or be associated with a processor for performing the band selection methods described herein, including, for example, switching a band or carrier frequency of transmission. A peer client may further comprise or be associated with a memory for storing thereon band data, including, for example, available bands for communication to and/or from a peer client, as described below. A peer client may communicate with a client 130 independent of a connection with other network components, for example by establishing a PAN or a WPAN between a client 130 and a peer client. In some embodiments of the invention a client 130 and a peer client may form a connection and may establish communication as described herein that may be independent of a connection to a network, e.g. a cellular telephone may connect to a laptop computer, and each may or may not be connected to a larger network during communication. Such a connection may establish peer-to-peer communication, and may be referred to as STA to STA communication.

Figure 2:
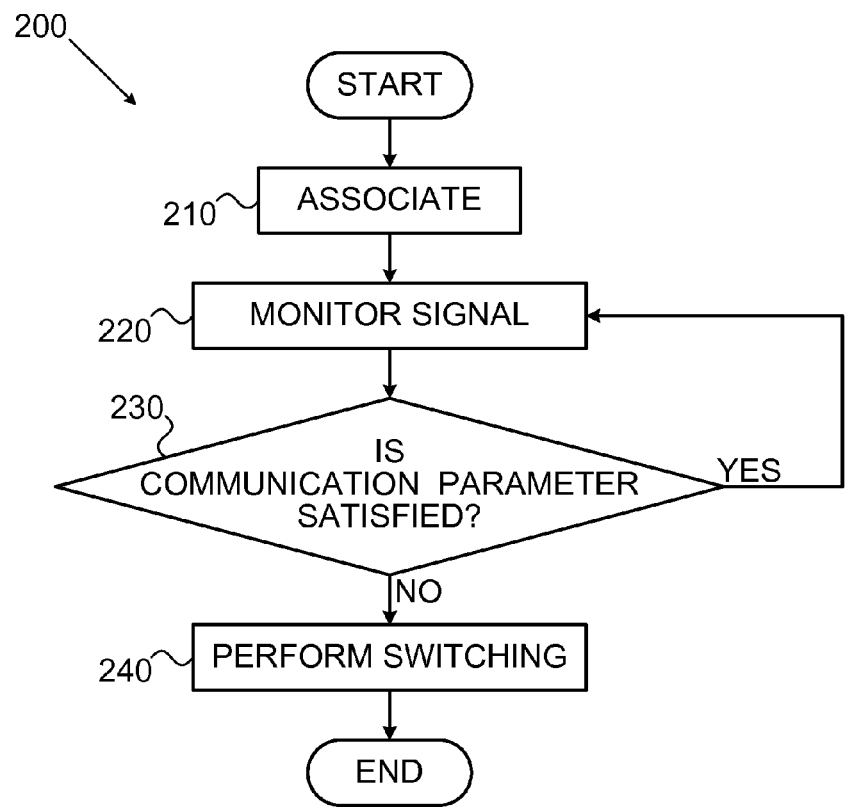
FIG. 2 depicts a method of band selection according to embodiments of the present invention.

In an embodiment of the invention, a STA may operate according to an exemplary method (200) of FIG. 2. A STA may associate with a peer STA (210) and may determine a channel and band capability that may be in common among STAs. During data communication, a STA may monitor transmitted and received signals (220). A STA may monitor one or more communication parameters and/or quality of service parameters, for example data throughput or power consumption, and may use feedback from a peer STA as an additional or lone parameter. A STA may determine if a communication parameter may be satisfied (230) for criteria for data transfer. If criteria may be met according to a comparison with one or more communication parameters, a STA may continue to monitor traffic on a channel. Monitoring may be continuous or may be periodic, and may be in accordance with a protocol. If criteria may not be met, for example if a threshold may not be achieved, a STA may perform switching (240) from a current communication band to another communication band that may have been determined to be available during an association (210). Switching may be initiated by a STA that may have been monitoring data transfer, or switching may be initiated by a peer STA that may have been monitoring data transfer and may communicate an intent to switch bands to a STA.

According to an embodiment of the invention, a protocol may be used to maintain connectivity between STAs when operating bands may be switched. A protocol may be used to signal conditions under which an operation may switch from an operating band to another operating band, and/or to provide a signal of an actual switching of bands. A signaling protocol may be an out-of-band control signaling protocol, and may use a common control channel that may be present. A common control channel may be common between a transmitting STA and a peer STA, for example an access point STA 120 and a client STA 130, and may provide a robust link over which control message exchanges may occur between STAs, and may do so during data transfer or when data transfer may not be occurring. A control channel may be a physical channel and may be, for example, a low frequency band channel that may be available. A control channel may be available at a STA and at a peer STA, for example by each STA operating a separate radio and/or transmitter and receiver pair, or transceiver, that may be operating on an independent channel, for example a low frequency band channel, and may be always available. A control channel may be a virtual channel and may be formed by, for example, a scheduling arrangement or another arrangement that may be agreed to and set among peer STAs. For example, STAs may be present, transmitting and/or listening in a low frequency band for a predetermined period of time, e.g., 1 millisecond for every 50 millisecond period. A control channel may have a fixed relationship with a data channel, and this relationship may be by a mapping, for example a control channel mapping. An exemplary mapping may be a mapping between a higher frequency band, e.g. a 60 GHz band, and a lower frequency band, e.g. a 2.4 GHz band, and may be shown by a mapping table.

| Channel in a 60 GHz Frequency Band | Control Channel in a 2.4 GHz Frequency Band |
|---|---|
| 1 | 1 |
| 2 | 6 |
| 3 | 11 |

For example, a channel in a 60 GHz band may be designated as channel 1, and may correspond to a control channel in a 2.4 GHz band that may be designated as channel 1. Another channel in a 60 GHz band may be designated as channel 2, and may correspond to a control channel in a 2.4 GHz band that may be designated as channel 6, and another channel in a 60 GHz band may be designated as channel 3, and may correspond to a control channel in a 2.4 GHz band that may be designated as channel 11. In such an exemplary embodiment, a 2.4 GHz band may contain control channels for a control signaling protocol, and may correspond to a data transfer band at a 60 GHz band. A mapping may be predetermined and may be stored at STAs that may connect to a common network. A mapping may be dynamically announced by a STA, and may be received by a peer STA, and may be, for example, temporarily stored at both STAs.

In another embodiment of the invention a control signaling protocol may be in a same channel as data communication and/or transfer. A control channel may be a physical channel or a virtual channel, either using a band that may be a same band as a data transfer band, and may operate in a similar manner as substantially described above. For example, a control protocol may use a time-sharing protocol and operate as a virtual channel.

Figure 3:
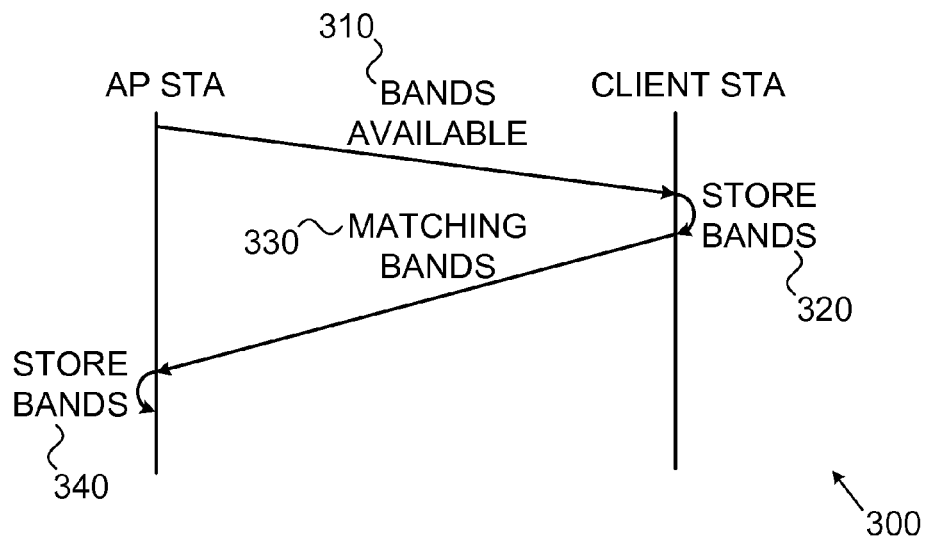
FIG. 3 depicts a method of association according to embodiments of the present invention.

According to embodiments of the invention, several preparatory steps prior to the event of monitoring and switching may be performed, for example, as depicted in the schematic communication diagram (300) of FIG. 3. In an embodiment of the invention, during an association session, an AP STA may communicate with a client, or a peer STA. An AP STA may broadcast available bands that it may be able to use to support communication (310). A client STA may receive a band availability broadcast from an AP STA and compare this information to its own list of available communication bands that it may be able to use to support communication, and may store a list of bands (320) that may match. A client STA may transmit a list of one or more matching bands (330) to an AP STA, and this transmission may be a response. An AP STA may receive a response and store a list of matching bands that it may associate with a client STA. When a response may comprise a plurality of matching bands, an AP STA and a client STA may determine that multi-band communication and switching may be utilized. It may be understood that a same method may be initiated by a broadcast that may initiate from a client STA, and may continue substantially as above.

In an embodiment of the invention, a control channel may be present and a STA may signal an intent to switch to another band by sending a message to a peer STA that may also be operating on a control channel. A message may specify, for example, that a switch to another band may occur immediately, or a message may provide a schedule that may, for example, indicate a future point, e.g. a specific time or time slot, when a band switch may occur.

An embodiment of the invention may use in-band signaling when, for example, a control channel may not be present, or active. A STA that may have connectivity to a peer STA in a data channel may send a message to a peer STA on a data channel that may be a signal message. A signal message may signal an intent to switch to another band. A signal message may specify, for example, that a switch to another band may occur immediately, or a signal message may provide a schedule that may, for example, indicate a future point, e.g. a specific time or time slot, when a band switch may occur.

In another embodiment of the invention in-band signaling may be used when, for example, a control channel may not be present, or active, and a STA may provide a signal prior to a transfer of data. Such a signal may contain an instruction message, and may comprise instructions for maintaining communication in an event of a loss of a data transfer communication. For example, an instruction may be to search in a selected band, or a predetermined band, for communication in an event of a loss of communication in an active data transfer band. A STA may determine that a loss of connectivity may have occurred using a variety of methods, for example by re-transmitting a data packet a predetermined number of times without receiving a positive acknowledgement, or for example by determining that no data may have been received from a peer STA that it may be connected to after a predetermined amount of time. Upon determining that a loss of connectivity may have occurred, a STA may switch to another band, and a band selection may be in accordance with an instruction message that may have been received prior to data transmission, in order to re-establish connectivity. After switching to an alternate band, a STA may attempt to contact a peer STA with which it may be communicating.

Figure 4:
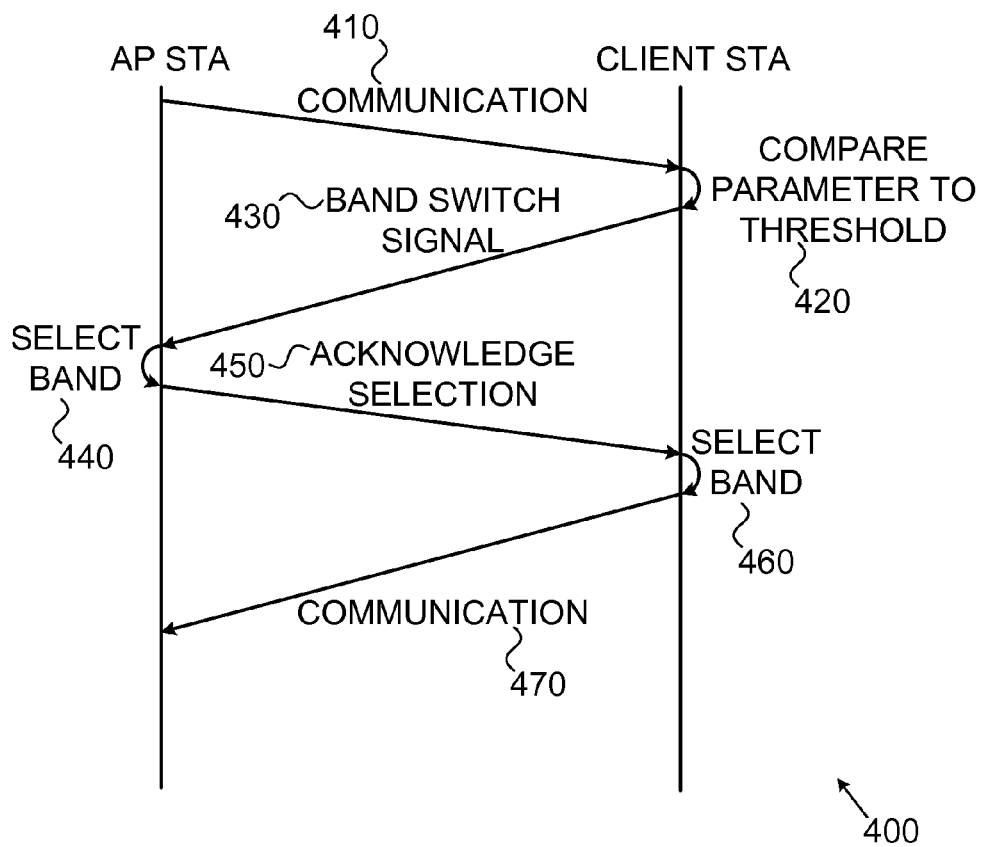
FIG. 4 depicts a method of band selection according to embodiments of the present invention.

According to embodiments of the invention, STAs may determine to switch bands, for example, as depicted in the schematic communication diagram (400) of FIG. 4. In an embodiment of the invention, an AP STA may be in communication with a client STA (410). A client STA may be monitoring one or more communication parameters, as described above, and may compare these to one or more thresholds (420). Should one or more parameters fail to meet a threshold, for example a predetermined threshold that may be a measure of a communication parameter, e.g. data throughput or signal strength, a STA may make a determination to switch data communication bands. A client STA sends a band switch signal (430) to an AP STA, for example in accordance with a protocol, and a band switch signal may contain information about a band to switch to next. A band may be selected from a predetermined list of available bands, for example that may have been predetermined during an association, and a list may be stored in a memory. An AP STA may receive a band switch signal and may select another band (440) for data communication, and a selection may be in accordance with information that may be contained in a received band switch signal. An AP STA may transmit using a new data communication band, and may send a signal that may be an acknowledgement of a new band selection (450). A client STA may select a new data communication band (460) that may be in accordance with information that may be contained in a band switch signal, and may receive an acknowledgement signal from an AP STA. Communication may continue on a newly selected band between a client STA and an AP STA (470). Other activities, for example monitoring of a communication signal, may also continue. In similar fashion, monitoring and comparisons may occur at an AP STA, and an AP STA may initiate a band switch signal, and switching may occur from monitoring and comparisons that may occur at an AP STA, substantially as above.

In an exemplary embodiment of the invention, a STA and a peer STA may be available to communicate over, for example a 2.4 GHz band and a 60 GHz band. An exemplary graph (500) of performance conditions that may be observed is depicted by FIG. 5. Referring to the graph, Physical (PHY) data rates (510) are plotted with respect to a distance (520) between the STAs. A plot may be a performance curve for an operation at a 60 GHz band (530). Another plot may be a performance curve for an operation at a 2.4 GHz band (540). From such plots that may represent performance of a link for a channel, thresholds may be determined that may be used to determine parameters for selecting a point for performing a band switching operation. For example, a range may decrease, e.g. to 10 meters, and may become possible to switch from a 2.4 GHz band to a 60 GHz band (550), and such switching may provide an improvement in a data transfer rate. A range may increase, e.g. to 16 meters, and a STA may determine to switch from, for example, a 60 GHz band to a 2.4 GHz band (560), and such switching may provide an extended distance range for operation of a link.

According to embodiments of the invention, channel or band switching may occur on a frequent basis, for example when a STA may be mobile, or when channel conditions may be changing. Upper layer protocols, e.g. Internet Protocol (IP), Access Resolution Protocol (ARP), or Transmission Control Protocol (TCP), may be undisturbed by a switching operation. A switching operation may be performed in a way such that upper layer protocols may remain intact and/or undisturbed by a switching operation. A STA, for example an AP STA may present a single Media Access Control (MAC) address to upper layers of, for example an upper layer control protocol. A selection of a channel or band to use for communication may then occur below a MAC Service Access Point (SAP), and may be hidden from higher layers. A STA that may establish itself in such a manner may be able to perform band switching while leaving upper layers of a protocol undisturbed.

In some embodiments of the invention, switching between bands may occur frequently or over a short period of time. When link conditions may deteriorate, a fast switching between bands may occur. A new Basic Service Set (BSS) may not need to be established when band switching according to methods described above, and this condition may allow for fast switching between bands.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for wireless communication, comprising:
   determining, by a first wireless communication device, a plurality of available bands for wireless communication with a second wireless communication device and a list of available bands for communication by the first wireless communication device;
   wirelessly transmitting, by the first wireless communication device to the second wireless communication device over a first band, a beacon containing an information element identifying at least a second band different than the first band that can be used by the first wireless communication device;
   wirelessly transmitting, via a control channel, an indication to switch from the first band to the second band, the control channel different from the first band and the second band, the indication to switch transmitted in response to determining that a signal quality associated with the first band fails to satisfy a threshold, the first band corresponding to a lower frequency band than the second band;
   presenting a single media access control address to a protocol layer above a current protocol layer of the first wireless communication device while performing a switching operation to switch from communicating using the first band to communicating using the second band; and
   communicating with the second wireless communication device over the second band,
   wherein the first and second bands are included in the list of available bands that are available for communication by the first wireless communication device and at least one of the first and second bands is a 60 GHz band, and
   wherein the information element is defined by standard IEEE 802.11ad.

2. The method of claim 1, wherein the plurality of available bands includes a 2.4 GHz band, a 5 GHz band, and a 60 GHz band.

3. The method of claim 1, wherein the control channel is a first frequency band channel included in a first frequency band having a lower power consumption than a second frequency band.

4. The method of claim 1, wherein the control channel is a virtual channel formed between the first wireless communication device and the second wireless communication device by a scheduling arrangement.

5. The method of claim 1, wherein the protocol layer includes an upper layer control protocol that is at least one of an Internet Protocol, an Access Resolution Protocol or a Transmission Control Protocol.

6. A first wireless communication device having a processor, a memory, and an antenna, the first wireless communication device to:
   determine a plurality of available bands for wireless communication with a second wireless communication device and a list of available bands for communication by the first wireless communication device;
   wirelessly transmit, to the second wireless communication device over a first band, a beacon containing an information element identifying at least a second band different than the first band that can be used by the first wireless communication device;
   wirelessly transmit, via a control channel, an indication to switch from the first band to the second band in response to a determination that a signal quality associated with the first band fails to satisfy a threshold, the first band corresponding to a lower frequency band than the second band, the control channel different from the first band and the second band;
   present a single media access control address to a protocol layer above a current protocol layer of the first wireless communication device while performing a switching operation to switch from communicating using the first band to communicating using the second band; and
   communicate with the second wireless communication device over the second band,
   wherein the first and second bands are included in the list of available bands that are available for communication by the first wireless communication device and at least one of the first and second bands is a 60 GHz band, and
   wherein the information element is defined by standard IEEE 802.11ad.

7. The first wireless communication device of claim 6, wherein the plurality of available bands includes a 2.4 GHz band, a 5 GHz band, and a 60 GHz band.

8. The first wireless communication device of claim 6, wherein the control channel is a first frequency band channel included in a first frequency band having a lower power consumption than a second frequency band.

9. The first wireless communication device of claim 6, wherein the control channel is a virtual channel formed between the first wireless communication device and the second wireless communication device by a scheduling arrangement.

10. A method for wireless communication, comprising:
determining, by a first wireless communication device, a plurality of available bands for wireless communication with a second wireless communication device and a list of available bands for communication by the first wireless communication device;
wirelessly receiving, by a first wireless communication device from a second wireless communication device over a first band, a beacon containing an information element identifying at least a second band different than the first band that can be used by the second wireless communication device;
wirelessly receiving, via a control channel, an indication to switch from the first band to the second band, the control channel different from the first band and the second band, the indication to switch received in response to a determination that a signal quality associated with the first band fails to satisfy a threshold, the first band corresponding to a lower frequency band than the second band;
presenting a single media access control address to a protocol layer above a current protocol layer of the first wireless communication device while performing a switching operation to switch from communicating using the first band to communicating using the second band; and
communicating with the second wireless communication device over the second band,
wherein the first and second bands are included in a list of available bands that are available for communication by the second wireless communication device and at least one of the first and second bands is a 60 GHz band, and
wherein the information element is defined by standard IEEE 802.11ad.

11. The method of claim 10, wherein the plurality of available bands includes a 2.4 GHz band, a 5 GHz band, and a 60 GHz band.

12. A first wireless communication device having a processor, a memory, and an antenna, the first wireless communication device to:
determine a plurality of available bands for wireless communication with a second wireless communication device and a list of available bands for communication by the first wireless communication device;
wirelessly receive, from the second wireless communication device over a first band, a beacon containing an information element indicating at least a second band different than the first band that can be used by the second wireless communication device;
wirelessly receive, via a control channel, an indication to switch from the first band to the second band in response to a determination that a signal quality associated with the first band fails to satisfy a threshold, the first band corresponding to a lower frequency band than the second band, the control channel different from the first band and the second band;
present a single media access control address to a protocol layer above a current protocol layer of the first wireless communication device while performing a switching operation to switch from communicating using the first band to communicating using the second band; and
communicate with the second wireless communication device over the second band,
wherein the first and second bands are included in a list of available bands that are available for communication by the second wireless communication device and at least one of the first and second bands is a 60 GHz band, and
wherein the information element is defined by standard IEEE 802.11ad.

13. The first wireless communication device of claim 12, wherein the plurality of available bands includes a 2.4 GHz band, a 5 GHz band, and a 60 GHz band.

14. A non-transitory tangible storage medium containing instructions-that, when executed, cause a processor to at least:
determine, by a first wireless communication device, a plurality of available bands for wireless communication with a second wireless communication device and a list of available bands for communication by the first wireless communication device;
wirelessly transmit, by the first wireless communication device, to the second wireless communication device over a first band, a beacon containing an information element identifying at least a second band different than the first band that can be used by the first wireless communication device;
wirelessly transmit, via a control channel, an indication to switch from the first band to the second band in response to a determination that a signal quality associated with the first band fails to satisfy a threshold, the first band corresponding to a lower frequency band than the second band, the control channel different from the first band and the second band;
present a single media access control address to a protocol layer above a current protocol layer of the first wireless communication device while performing a switching operation to switch from communicating using the first band to communicating using the second band; and
communicate with the second wireless communication device over the second band,
wherein the first and second bands are included in the list of available bands that are available for communication by the first wireless communication device and at least one of the first and second bands is a 60 GHz band, and
wherein the information element is defined by standard IEEE 802.11ad.

15. The medium of claim 14, wherein the plurality of available bands includes a 2.4 GHz band, a 5 GHz band, and a 60 GHz band.

16. The medium of claim 14, wherein the control channel is a first frequency band channel included in a first frequency band having a lower power consumption than a second frequency band.

17. The medium of claim 14, wherein the control channel is a virtual channel formed between the first wireless communication device and the second wireless communication device by a scheduling arrangement.

18. A non-transitory tangible storage medium containing instructions-that, when executed, cause a processor to at least:
determine, by a first wireless communication device, a plurality of available bands for wireless communication with a second wireless communication device and a list of available bands for communication by the first wireless communication device;

wirelessly receive, at the first wireless communication device from the second wireless communication device over a first band, a beacon containing an information element identifying at least a second band different than the first band that can be used by the second wireless communication device;

wirelessly receive, via a control channel, an indication to switch from the first band to the second band in response to a determination that a signal quality associated with the first band fails to satisfy a threshold, the first band corresponding to a lower frequency band than the second band, the control channel different from the first band and the second band;

present a single media access control address to a protocol layer above a current protocol layer of the first wireless communication device while performing a switching operation to switch from communicating using the first band to communicating using the second band; and communicate with the second wireless communication device over the second band, wherein the first and second bands are included in the list of available bands that are available for communication by the first wireless communication device and at least one of the first and second bands is a 60 GHz band, and wherein the information element is defined by standard IEEE 802.11ad.

19. The medium of claim 18, wherein the plurality of available bands includes a 2.4 GHz band, a 5 GHz band, and a 60 GHz band.

* * * * *